United States Patent [19]

Ritter et al.

[11] Patent Number: 4,839,148
[45] Date of Patent: Jun. 13, 1989

[54] METHOD OF REMOVING $SO_x$ AND $NO_x$ FROM EFFLUENT GAS

[75] Inventors: Günter Ritter, Brühl; Peter Asmuth, Neuss; Ludwig Raible, Bedburg, all of Fed. Rep. of Germany

[73] Assignee: Rheinische Braunkohlenwerke A.G., Cologne, Fed. Rep. of Germany

[21] Appl. No.: 120,267

[22] Filed: Nov. 13, 1987

[30] Foreign Application Priority Data

Nov. 15, 1986 [DE] Fed. Rep. of Germany ....... 3639112

[51] Int. Cl.$^4$ .......................... B01J 8/00; C01B 17/00
[52] U.S. Cl. .................................... 423/239; 423/235; 423/242; 423/244
[58] Field of Search ............... 423/239, 239 A, 242 A, 423/242, 244 A, 244, 235, 235 D

[56] References Cited

U.S. PATENT DOCUMENTS

| | | | |
|---|---|---|---|
| 2,992,895 | 7/1961 | Feustel et al. | 23/161 |
| 3,910,766 | 10/1975 | Yamada | 23/260 |
| 4,427,642 | 1/1984 | Arashi et al. | 423/244 |
| 4,469,662 | 9/1984 | Hamada et al. | 423/239 |
| 4,500,501 | 2/1985 | Hamada et al. | 423/239 |
| 4,629,609 | 12/1986 | Fruhbuss | 423/239 |
| 4,732,743 | 3/1988 | Schmidt et al. | 423/239 |
| 4,735,927 | 4/1988 | Gerdes et al. | 423/239 |

FOREIGN PATENT DOCUMENTS

| | | | |
|---|---|---|---|
| 1181682 | 11/1964 | Fed. Rep. of Germany . | |
| 3232543 | 6/1983 | Fed. Rep. of Germany . | |
| 3443686 | 11/1984 | Fed. Rep. of Germany . | |
| 3342500 | 6/1985 | Fed. Rep. of Germany . | |
| 49-98775 | 1/1973 | Japan . | |
| 49-98778 | 9/1974 | Japan . | |
| 58-174224 | 10/1983 | Japan | 423/239 |
| 58-186421 | 10/1983 | Japan | 423/239 |

*Primary Examiner*—Gregory A. Heller
*Attorney, Agent, or Firm*—Seidel, Gonda, Lavorgna & Monaco

[57] ABSTRACT

For the removal of $SO_x$ and $NO_x$ from effluent gas, the gas, before being passed through a Selective Catalytic Reduction catalyst bed for reduction of at least a part of the nitrogen oxides in the gas, is subjected to at least substantially complete desulfurization in a coke bed. The desulfurized and denoxed gas can also be passed through a coke bed in which the ammonia which has not reacted in the SCR-catalyst bed is removed from the gas.

7 Claims, 1 Drawing Sheet

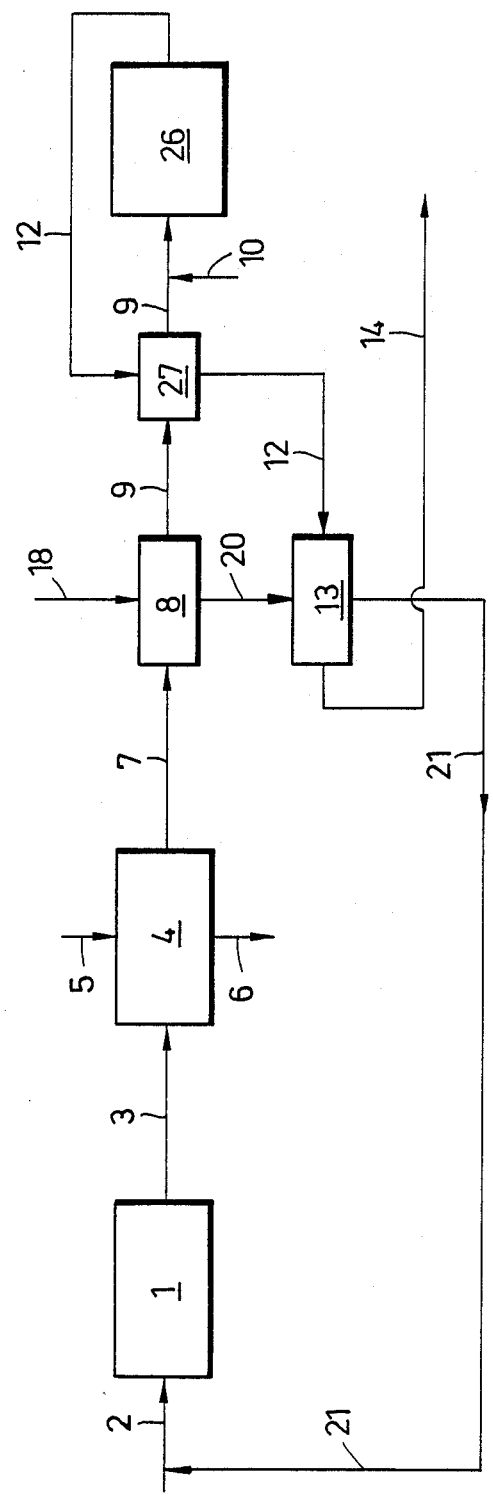
FIGURE

METHOD OF REMOVING $SO_x$ AND $NO_x$ FROM EFFLUENT GAS

BACKGROUND OF THE INVENTION

One form of method of removing $SO_x$ and $NO_x$ from effluent gas which can be used for example for cleaning flue gases from a power station which is operated with fossil fuels comprises firstly passing the effluent gas through a desulfurisation plant and, after a feed of ammonia, through an SCR catalyst bed for the reduction of at least a part of the nitrogen oxides contained in the effluent gas. Herein SCR means Selective Catalytic Reduction. The general aim at the present time in that flue gases of that kind, when passing into the atmosphere, contain no or only a little $SO_x$ and $NO_x$.

In order to reduce the level of emission of nitrogen oxides, use is predominantly made of the catalytic reduction of $NO_x$ with ammonia, to give nitrogen. There are a number of methods which can be used for that purpose. In the SCR method, for example, catalysts of different compositions, for example comprising ceramic or ceramic material and/or metal/metal oxide in the form for example of honeycomb bodies and plates are used. The temperatures at which such SCR-catalysts are employed is generally around 300° C.

In one method of removing sulfur and nitrogen oxides from a flue gas, as disclosed in German laid-open application (DE-OS) No. 32 32541, the flue gas, for removal of the sulfur oxides, is passed through a bed consisting of a coal-bearing adsorption agent, and ammonia is added to the gas to remove the nitrogen oxides. In that process, at least two coal-bearing adsorption beds are used, one of which serves as a catalyst in the operation of removing the nitrogen oxides. The other adsorption bed serves for removing from the flue gas the sulfur oxides and ammonia which had not been consumed in the catalyst bed for conversion of the nitrogen oxides.

As indicated above, the present invention is generally concerned with a method of removing sulfur oxides and nitrogen oxides from flue gas, in which an SCR-catalyst bed is used for removal of the nitrogen oxides or at least a part thereof. In comparison with the use of a bed comprising carbon-bearing catalyst material, for example coke, such a method using an SCR-catalyst bed has the advantage of giving a longer operating life, although the level of activity of an SCR-catalyst also experiences a slight reduction, in the passage of time. As will be appreciated, a necessary condition for a longer operational life is that the flue gas which flows through the SCR-catalyst should not include any components which are deposited on the catalyst or which in some other fashion have such a severely adverse effect on the effectiveness of the catalyst that the catalyst has to be replaced or processed after a relatively short period of time.

SUMMARY OF THE INVENTION

An object of the present invention is to provide a method of removing $SO_x$ and $NO_x$ from effluent gas, using an SCR-catalyst bed, in which adverse effects thereon which can result in a reduction in its operating life are at least substantially avoided.

Another object of the present invention is to provide a method of removing $SO_x$ and $NO_x$ from effluent gas, in which a drop in level of activity of the SCR-catalyst bed is compensated for.

Still another object of the present invention is to provide a method of removing $SO_x$ and $NO_x$ from effluent gas from a power station, which affords a reduced level of environmental pollution, including in respect of ammonia.

Yet a further object of the present invention is to provide a method of removing $SO_x$ and $NO_x$ which enjoys an enhanced level of effectiveness and operating economy by virtue of using the same material in a plurality of operating stages in the method.

These and other objects are achieved in accordance with the teachings of the invention by a method of removing $SO_x$ and $NO_x$ from effluent gas, which comprises passing the effluent gas through a desulfurisation stage in which the gas is passed through a coke bed. Ammonia is then added to the gas, followed by the gas being passed through a selective catalytic reduction catalyst bed for reduction of at least a part of the nitrogen oxide or oxides contained in the gas.

The presence of the coke bed in the desulfurisation operation means that the effluent or flue gas which passes into the SCRcatalyst bed downstream thereof is practically sulfur-free. Accordingly, that prevents the formation, which is otherwise inevitable due to the addition of ammonia, of ammonium sulfate $(NH_4)_2SO_4$ and ammonium hydrogen sulfate $(NH_4)H_2SO_4$. The presence of ammonium sulfate or ammonium hydrogen sulfate is particularly undesirable for the reason that in the denoxing stage, that is to say in the SCR-catalyst bed, such a substance result in deposits at any event when the temperature in the denoxing stage falls below certain minimum values. Such deposits of ammonium sulfate or ammonium hydrogen sulfate adversely affect the effectiveness of the SCR-catalyst as such deposits necessarily reduce the effective surface area of the catalyst. The operation of cleaning the SCR-catalyst, which is necessary in order to maintain a sufficiently large catalytically active surface area in respect of the catalyst gives rise to additional cost. In addition, that mode of operation gives rise to the production of ammonium-bearing water which has to be removed as it gives rise to enviromental pollution; as will be appreciated however, the operation of removing the ammonium-bearing water also gives rise to further costs. In addition, the coke bed has the advantage that it acts as a filter to retain heavy metals and dust which can also severely reduce the level of effectiveness of the SCR-catalyst.

In accordance with a preferred feature of the teachings of this invention, the gas coming from the coke bed for the desulfurisation stage may be passed through a heat exchanger in which the gas is heated before passing into the SCR-catalyst bed for the at least partial reduction of the nitrogen oxides contained in the effluent gas. The heating operation which also promotes the effectiveness of the reduction operation in the SCR-catalyst bed may be performed to such a degree that in order to provide additional safeguards against deposits on the catalyst material, temperatures are attained at which such deposits can be reliably prevented. However that in turn makes it necessary to consume an additional amount of energy. Furthermore, an additional operation of that nature would not prevent the occurrence of deposits in the heat exchanger, which would then also have to be cleaned to remove such deposits, at certain intervals of time. A major advantage of the invention is therefore that it is not a necessary step for the gas to be heated in order to avoid the formation of deposits.

In accordance with a further preferred feature of the invention, it has been found that a form of the method is particularly advantageous, in which the cleaned, unreacted ammonia-bearing effluent gas, after passing through the SCR-catalyst bed for the removal of said ammonia, is passed through a bed containing coke which had previously been used for the adsorption of at least a part of the sulfur contained in the effluent gas. Such a mode of operation has the advantage, in connection with an SCR-catalyst bed, that the level of activity of the SCR-catalyst, which falls in the course of time, can be compensated by an increased addition of ammonia, with the result that in that way it is possible for the SCR-catalyst to enjoy a considerably longer operating life. The increase in the length of the operating life may involve for example a doubling thereof. Thus, if for example the normal operating life is around 5 years, the use of the method in accordance with the invention means that it is possible to achieve an operating life of around 10 years, for the reduction in the level of activity of the catalyst, which will be found to occur generally at around the 5 year time, is compensated by increased amounts of $NH_3$ being used. It will be appreciated that the increased amounts of $NH_3$ also result in a larger amount of unconsumed ammonia in the effluent gases leaving the denoxing stage, that is to say the SCR-catalyst bed. However that can generally be readily accepted as the amounts of ammonia required are low in any case and the unreacted $NH_3$ is removed in the downstream-disposed coke bed, to such an extent as not to constitute a serious source of environmental pollution.

Moreover, the coke bed through which the effluent gas flows before passing into the denoxing stage may only serve for post-desulfurisation purposes, after the major part of the sulfur had already been removed from the gas in a main desulfurisation plant disposed upstream of the coke bed.

The main desulfurisation unit may operate with basic, calcium-bearing sorption agents for desulfurisation purposes. That includes the wet processes which are arranged downstream of an operation for removing dust from the effluent gas and in which the $SO_x$ is separated out by means of lime-bearing or limestone-bearing washing solutions and removed as a component in the form of gypsum from the effluent gas cleaning procedure. In dry or semi-dry processes, the sorption agent is sprayed in the form of a solution, a suspension or in dry form, into the flow effluent gas and separated out at a filter after the $SO_x$ has been bound in, in dry form. Another procedure provides adding lime/limestone to the fuel, thereby providing for direct binding of the sulfur during the combustion operation.

It is however also possible for all the sulfur which is to be found in the effluent gas to be removed in the coke bed, so that the coked bed therefore represents the sole desulfurisation stage.

In another preferred feature of the invention, it has been found advantageous to use hearth furnace coke produced from brown coal or lignite (the terms brown coal and lignite are used interchangeably herein), as the adsorption agent for the suflur and the unreacted ammonia. A process for the production of brown coal or lignite coke in a hearth furnace is described in detail for example in the following publications:

H.B. Koenigs: 'Feinkokserzeugung aus Braunkohle' Energiewirtschaftliche Tagesfragen, 27th edition 1977, issue 8/9, pages 569–599.

E. Scherrer: 'Herstellung von Braunkohlenkoks im Salem-Lurgi-Herdofen' Braunkohle, issue 7, July 1981, pages 242–246, and D. Bocker: 'Edle Korner' Energie, volume 35, issue 3, 1983, pages 35–37.

The above-listed publications are quoted as setting forth examples for procedures for the production of hearth furnace coke from brown coal or lignite, as much as may be required for better understanding of the background to the present invention and a disclosure in respect of such procedure is thus incorporated into this specification. The man skilled in the art will be generally aware of such processes for the production of hearth furnace coke from brown coal or lignite.

In this respect, it may be observed that hearth furnace coke is relatively cheap so that the coke which is charged with $SO_x$ and $NH_3$ is recycled and can be burnt, together with one or more other fuels, in the boiler whose flue gas is to be cleaned. The amounts of $SO_x$ which are produced in that way are low and are separated out in the desulfurisation step. Additional loading of the effluent gases with $NO_x$ by virtue of the coke which is burnt in the boiler being loaded with ammonia which has not reacted in the denoxing stage is not a significant aspect as on the one hand the absolute amounts of ammonia which has not reacted in the denoxing stage and which is to be separated out are low while on the other hand the ammonium sulfate $(NH_4)_2SO_4$ or ammonium hydrogen sulfate $(NH_4)H_2SO_4$ formed in the separation operation at the coke bed has an advantageous fuel nitrogen conversion rate, that is to say, after passing through the firing equipment of the boiler, only a small proportion thereof recurs as $NO_x$ in the effluent gas.

Further objects, features and advantages of the present invention will be apparent from the following description of a preferred embodiment.

BRIEF DESCRIPTION OF THE DRAWING

The single Figure of the accompanying drawing shows a flow chart of the operating procedure involved in the method of the present invention.

DESCRIPTION OF THE PREFERRED EMBODIMENT

Referring therefore not to the drawing, shown therein at reference numeral 1 is a power station boiler in which fossil fuel such as pit coal or brown coal or lignite is burnt. The feed of fuel to the boiler 1 is indicated at 2. The effluent or flue gas 3 which is produced by the boiler 1 is passed to an effluent gas desulfurisation unit 4 in which the sulfur oxide $SO_x$ which is entrained in the flue gas 3 is converted by means of lime 5, $Ca(OH)_2$, into gypsum, $CaSO_4$, as indicated at 6. In that reaction, the major part of the sulfur oxide contained in the gas 3 is removed. Instead of the conversion of sulfur oxide into gypsum in the effluent gas desulfurisation unit 4, it is also possible to employ another form of method for desulfurisation purposes, for example the method known as the Walther method.

The effluent gas 7 which leaves the effluent gas desulfurisation unit 4 after having been subjected to preliminary desulfurisation therein and from which dust may be removed by a dust-removal unit (not shown), is then passed through a coke bed as indicated at 8 in which the residual sulfur is removed from the effluent gas 7 by the sulfur oxides therein being adsorbed on the surface of the grains of the coke bed 8. The sulfur-free effluent gas 9 then is passed through a gas preheater 27 in which it is increased in temperature to about 300° C. Gaseous ammonia (NH₃) is then added at 10 to the flow of effluent gas 9 leaving the gas preheater 27, before the gas is passed through an SCR-fixed bed reactor as indicated at 26 in which the denoxing operation is carried out, that is to say, $NO_x$ is removed from the effluent gas in accordance with the following main reaction:

$$4\ NO + 4NH_3 + O_2 = 4\ N_2 + 6H_2O.$$

Disposed in the SCR-fixed bed reactor 26 are for example shaped bodies of ceramic material or bodies which contain ceramic material with additions of catalytically active components, and/or bodies of metal or metal oxide around which the effluent gas 9 flows. In that operation, the nitrogen oxide contained in the gas 9 is reduced to nitrogen.

The desulfurised and denoxed gas 12 leaving the reactor 26 is then firstly passed through a heat exchanger unit forming part of the gas preheater 27, in which it gives off its heat to the flue gas at 9 coming from the desulfurisation unit 8. It will generally be necessary for heat additionally to be supplied from the outside, in the heat exchanger at 27, in order to make up for the losses which are necessarily incurred.

The cooled gas 12 coming from the heat exchanger 27 is then passed through a coke bed 13 in which the excess ammonia which had not been reacted in the reactor 26 is adsorbed and thereby removed from the gas 12. The cleaned gas 14 can then be passed into the atmosphere.

Fresh coke which is therefore not loaded with adsorbed material is supplied at 18 to the coke bed 8 for desulfurisation of the effluent gas introduced thereinto at 7. Loaded or charged coke 20 is removed from the coke bed 8 and passed to the coke bed 13 in which the excess ammonia is separated out from the gas 12. The two beds 8 and 13 may be in the form of a travelling bed of which one part has the flue gas 7 to be desulfurised passing therethrough, while the desulfurised and denoxed flue gas 12 is passed through the other part for removed of the unreacted NH₃. The coke from the coke bed 13 is then recycled as indicated by 21 to the firing equipment of the boiler 1 where it is burnt with the fuel.

It will be seen from the foregoing description of the specific embodiment of the invention therefore that the adverse effects on the SCR-catalyst bed which can result in a reduction in its operating life which is otherwise theoretically possible, as discussed above, can be substantially avoided. Furthermore, with a falling level of activity of the SCR-catalyst be in the stage 26, it is possible to compensate therefore by an increased feed of ammonia without the cleaned effluent gas retaining a residual ammonia content which could result in unacceptable environmental pollution.

It will be appreciated that the foregoing method of the invention has been described with reference to the accompanying drawing only by way of example and that various modifications and alterations may be made therein without thereby departing from the spirit and scope of the invention.

What is claimed is:

1. A method of removing $SO_x$ and $NO_x$ from effluent gas comprising the steps of:
   (a) passing the effluent gas through a main desulfurisation stage in order to remove a substantial portion of $SO_x$ therefrom;
   (b) passing the gas through a post desulfurisation stage which is in the form of a first coke bed in order to remove residual $SO_x$;
   (c) feeding ammonia to the desulfurised gas;
   (d) passing the gas through a selective catalytic reduction catalyst bed in order to reduce $NO_x$;
   (e) recycling the coke previously used in the post desulfurisation stage to a second coke bed;
   (f) passing the gas through the second coke bed in order to remove unreacted ammonia from the gas; and
   (g) recycling the loaded coke from the second coke bed to a boiler which produces effluent gas to be further processed.

2. A method according to claim 1 further comprising passing the gas through a stage in order to remove dust therefrom.

3. A method according to claim 1 further comprising heating the gas leaving the post desulfurisation stage before passing the gas into the selective catalytic reduction catalyst bed.

4. A method according to claim 1 utilizing hearth furnace coke produced from lignite as the coke for the post desulfurisation stage.

5. A method according to claim 1 further comprising heat the gas leaving the post desulfurisation stage before feeding ammonia to the gas.

6. A method according to claim 5 further comprising cooling the gas leaving the selective catalytic reduction catalyst bed by bringing the gas into heat exchange relationship with the gas leaving the post desulfurisation stage.

7. A method according to claim 1 further comprising transferring the coke used in the post desulfurisation stage after a period of operation therein to the second coke bed for the removal of unreacted ammonia from the gas.

* * * * *